United States Patent
Fox et al.

(10) Patent No.: US 11,514,113 B2
(45) Date of Patent: Nov. 29, 2022

(54) STRUCTURAL GEOGRAPHIC BASED CULTURAL GROUP TAGGING HIERARCHY AND SEQUENCING FOR HASHTAGS

(71) Applicant: INTERNATIONAL BUSINESS MACHINES CORPORATION, Armonk, NY (US)

(72) Inventors: Jeremy R. Fox, Georgetown, TX (US); Michael Bender, Rye Brook, NY (US); Trudy L. Hewitt, Cary, NC (US); Robert Huntington Grant, Marietta, GA (US); Mark Delaney, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/948,512

(22) Filed: Sep. 22, 2020

(65) Prior Publication Data
US 2022/0092129 A1 Mar. 24, 2022

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/955* (2019.01); *G06F 16/9535* (2019.01); *G06F 16/9536* (2019.01); *G06F 40/56* (2020.01)

(58) Field of Classification Search
CPC ............... G06Q 50/01; G06Q 30/0226; G06Q 30/0241; G06Q 30/0251; G06Q 30/0261;
(Continued)

(56) References Cited

U.S. PATENT DOCUMENTS 8,504,573 B1 8/2013 Iampietro
8,601,079 B2 12/2013 Rajamanthiram
(Continued)

FOREIGN PATENT DOCUMENTS

CN 105431886 A 3/2016
WO 2017124116 A1 7/2017

OTHER PUBLICATIONS

Disclosed Anonymously, "Using Hashtag Compilation to Build Related Topic Map," IP.com, Sep. 9, 2016, 3 pages, IP.com No. IPCOM000247491D.
(Continued)

*Primary Examiner* — Shyue Jiunn Hwa
(74) *Attorney, Agent, or Firm* — Samuel A. Waldbaum

(57) ABSTRACT

Embodiments of the present invention disclose a method, computer program product, and system for generating hashtags. The method comprises receiving content to be posted on a social media service and analyzing the content to identify at least one item included in the content. Generating a first hashtag tree, wherein the content of the first hashtag tree contains information that indirectly relates to the identified at least one item, wherein the first hierarchical hashtag tree is comprised of multiple levels, wherein the first hierarchical hashtag tree includes words or phrases indirectly relates to the identified at least one item. Generating at least one hashtag from the first hierarchical hashtag tree and adding the at least one hashtag to the content and posting the content and the added at least one hashtag to the social media service, wherein the at least one hashtag is automatically added.

17 Claims, 6 Drawing Sheets

(51) Int. Cl.
*G06F 16/9535* (2019.01)
*G06F 40/56* (2020.01)
*G06F 16/955* (2019.01)
*G06F 16/9536* (2019.01)

(58) Field of Classification Search
CPC ............ G06Q 30/0269; G06Q 30/0201; G06F 16/381; G06F 16/438; G06F 16/48; G06F 40/284; G06F 16/24578; G06F 16/9535; G06F 16/954; G06F 16/9566; G06F 40/205; G06F 40/30; G06F 3/0482; G06F 3/04847; G06F 3/0488; G06F 3/167; G06F 1/1626; G06F 1/163; G06F 1/1656; G06F 1/1643; G06F 16/137; G06F 16/285; G06F 16/9027; G06F 16/906; G06F 16/2246; G06F 16/24568; G06F 16/5866; G06F 16/9014; G06F 16/9035; G06F 16/282; G06F 16/355; G06F 16/90335; G06F 12/0864; G06F 16/31; G06F 3/0604; G06F 16/20; G06F 16/22; G06F 16/2255; G06F 16/9558; G06F 21/6227; H04W 4/21; H04W 4/08; H04M 1/72403; H04M 1/72433; H04M 2201/38; H04M 2207/185; H04M 3/563; H04M 1/27475
See application file for complete search history.

(56) References Cited

U.S. PATENT DOCUMENTS

| | | |
|---|---|---|
| 9,009,162 B1 | 4/2015 | Luo |
| 9,928,646 B2 | 3/2018 | Chew |
| 11,120,093 B1* | 9/2021 | Cuan ................... G06F 16/9566 |
| 2008/0071770 A1 | 3/2008 | Schloter |
| 2013/0067333 A1 | 3/2013 | Brenneman |
| 2015/0161198 A1 | 6/2015 | Clift |
| 2016/0012739 A1 | 1/2016 | Jafari |
| 2016/0350421 A1* | 12/2016 | Multerer ............... G06F 16/951 |
| 2017/0052954 A1* | 2/2017 | State ....................... G06F 16/48 |
| 2017/0206250 A1* | 7/2017 | Loomans ............... G06Q 50/01 |
| 2018/0075061 A1 | 3/2018 | Purumala |
| 2019/0005156 A1 | 1/2019 | Smith |
| 2020/0097992 A1* | 3/2020 | Hasan .................. G06Q 30/0226 |
| 2022/0100789 A1* | 3/2022 | Kumar .................... G06F 16/45 |

OTHER PUBLICATIONS

Mell, et al., "The NIST Definition of Cloud Computing", National Institute of Standards and Technology, Special Publication 800-145, Sep. 2011, 7 pages.

Reueter, et al., "Segmenting Twitter Hashtags," International Journal on Natural Language Computing (IJNLC), Aug. 2016, pp. 23-36, vol. 5, No. 4, DOI: 10.5121/ijnlc.2016.5402, Retrieved from the Internet: <URL: https://www.scribd.com/document/323237855/SEGMENTING-TWITTER-HASHTAGS>.

* cited by examiner

STRUCTURAL GEOGRAPHIC BASED CULTURAL GROUP TAGGING HIERARCHY AND SEQUENCING FOR HASHTAGS

BACKGROUND

The present invention relates generally to the field of posting social media content, and more particularly to adding hashtags to the content based on the subject matter of the content.

Currently, within social collaboration, content is tagged with various hashtags that represent the searching structure for users to retrieve and find specific items within the social media. Social media content can be comprised of videos, photos, and other digital media that the user wants to share, and the social media content are full of hashtags representing the content or the user's representation of the content itself. Hashtags are simply used as singular filters to identify messages on a specific topic that are added by the user posting the social media content. The hashtags used are limited by the user knowledge of the subject matter of the content that is being posted.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for generating hashtags. The method comprises receiving content to be posted on a social media service and analyzing the content to identify at least one item included in the content. Generating a first hashtag tree, wherein the content of the first hashtag tree contains information that indirectly relates to the identified at least one item, wherein the first hierarchical hashtag tree is comprised of multiple levels, wherein the first hierarchical hashtag tree includes words or phrases indirectly relates to the identified at least one item. Generating at least one hashtag from the first hierarchical hashtag tree and adding the at least one hashtag to the content and posting the content and the added at least one hashtag to the social media service, wherein the at least one hashtag is automatically added.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
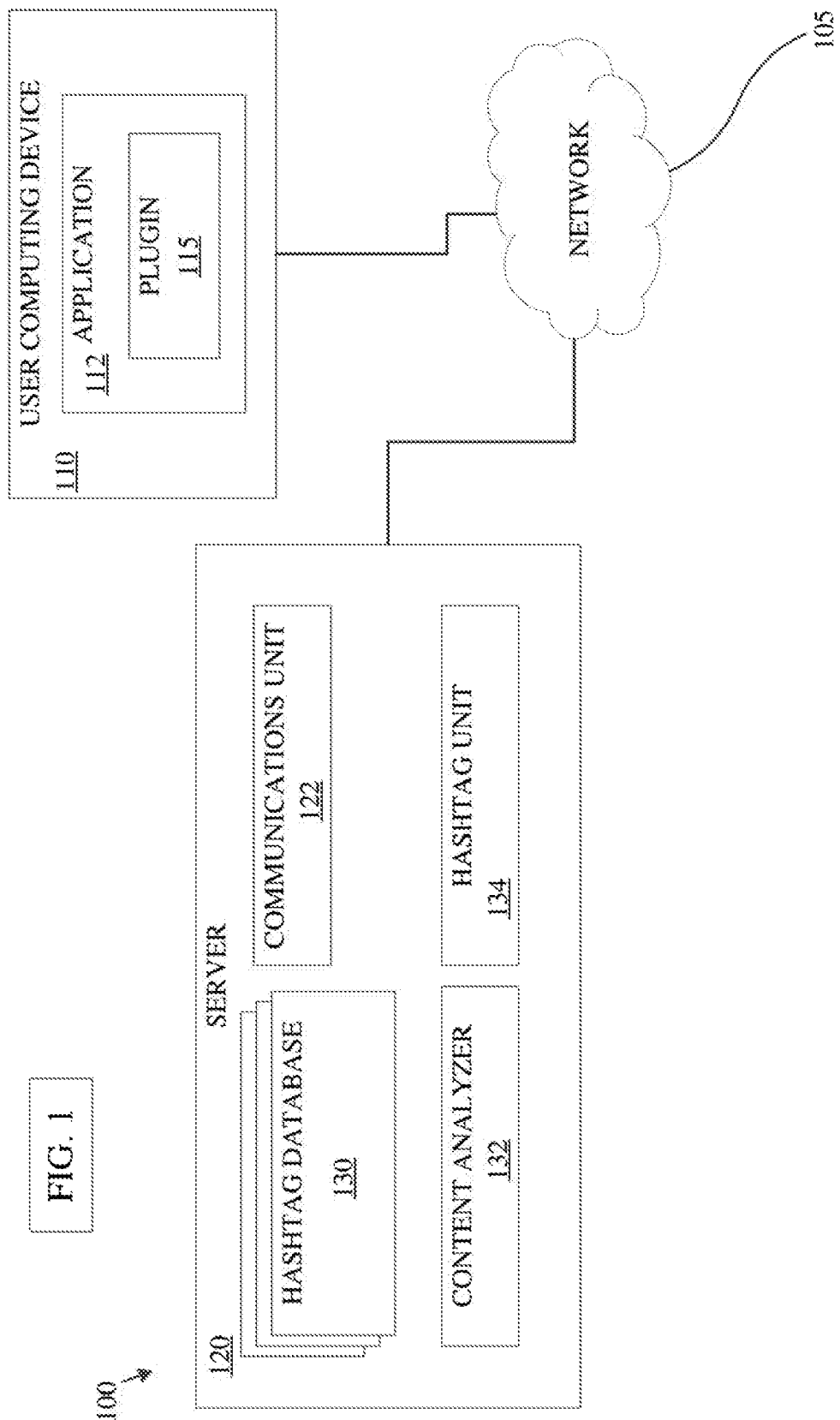
FIG. 1 is a functional block diagram illustrating a hashtag processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for adding hashtags to content (photos, video, audio, text) that a user wants to share on social media. Hashtags or tags are words or phrases that the user adds to a social media post, where the hashtags or tags reflect the subject matter of the post. Hashtags act as searchable indicators to the content of the social media post. A second user is able to search hashtags or tags of content in order to find the user social media post However, the hashtags are useful to the extent of the user's knowledge about the subject matter contained within the social media post. Many details relating to subject matter of the content are missed by the user when the user creates the hashtags. The user can miss adding hashtags to the content that directly relate to the subject matter of the content. Furthermore, the user can miss adding hashtags to the content that indirectly relate to the subject matter of the content. The hashtag system receives content (e.g. photos, video, audio files, text) from a user that the user wants to post on a social media service. The system receives additional data that accompanies the content to posted on social media. The data that accompanies the data can be, for example, any user created hashtags, user created text, and/or any metadata associated with the content. The metadata can be, for example, the location information (global positioning coordinates) as to where the content was created (e.g. picture taken, video made). The hashtag system determines the subject matter of the content by analyzing the content, user created hashtags, user created text, and any metadata that accompanies the content. The hashtag system creates a hashtag tree that relates to the subject matter of the content, wherein the hashtag tree includes words/phrases that directly relate to the subject matter. The hashtag system can also include in the hashtag tree or in a separate hashtag tree words/phrases that indirectly relate to the subject matter of the content. For example, if a user wants to post a picture of a Hawaiian beach, then words/phrases directly relating to the picture can be Hawaii, beach, ocean, sand, surfing, tanning, seashells, etc. Furthermore, words/phrases that can indirectly relate to the content can be cultural words associated with the location of the content or the subject matter of the content such as Polynesian, Polynesian boats, luau, local foods, etc.

After the hashtag system creates the hashtag tree, then the system can automatically create hashtags based on the hashtag tree and automatically add the created hashtags/tags to the content. The hashtag system can create hashtags from individual words or from a compilation of words. Alternatively, the system can utilize a graphical user interface to help the user create hashtags from the hashtag tree. For example, the graphical user interface (GUI) can have a drop down menu where the system suggests a plurality of options for the user to select from based on the created hashtag tree, when the user selects an option, then the system can suggest additional words/phrases to be added. The word or combination of words selected by the user will form the hashtag to be added. Alternatively, the system can combine the two systems, where the user selects a general subject for the hashtags to be directed towards, and then system automatically generates at least one hashtag that relates to the selected general subject and automatically adds the created at least one hashtag to the content.

FIG. 1 is a functional block diagram illustrating a hashtag processing environment 100, in accordance with an embodiment of the present invention.

Network 105 can be, for example, a local area network (LAN), a wide area network (WAN) such as the Internet, or a combination of the two, and can include wired, wireless, or fiber optic connections. In general, network 106 can be any combination of connections and protocols that will support communications between server 120 and user computing device 110.

User computing device 110 may be a laptop computer, tablet computer, netbook computer, personal computer (PC), a desktop computer, a personal digital assistant (PDA), a smart phone, or any programmable electronic device capable of communicating with server 120. User computing device may include internal and external hardware components, as depicted, and described in further detail with respect to FIG. 4. The user computing device 110 includes an application 112, for example, a web browser, a social media application, etc. that allows the user to share/upload content to the social media website. The user computing device 110 includes a graphical user interface (GUI) that allows the user to interact with the application 112.

The user selects the content (e.g. a photo, video, audio file, text) to be shared/uploaded on to social media and the user can add hashtags to be added to the content, via application 112. The application 112 can have a plug in 115 that allows for the hashtags generation system, as described below in further detail, to be part of the application 112. The automatic generation of hashtags, as illustrated in the figures, as being separate from the user computing device 110, but the automatic generation of hashtags can be part of the application 112 or it can be a separate plugin 115 for the application 112. The user computing device 110 transmits the content the user wants to share on social media to server 120.

Figure 5:
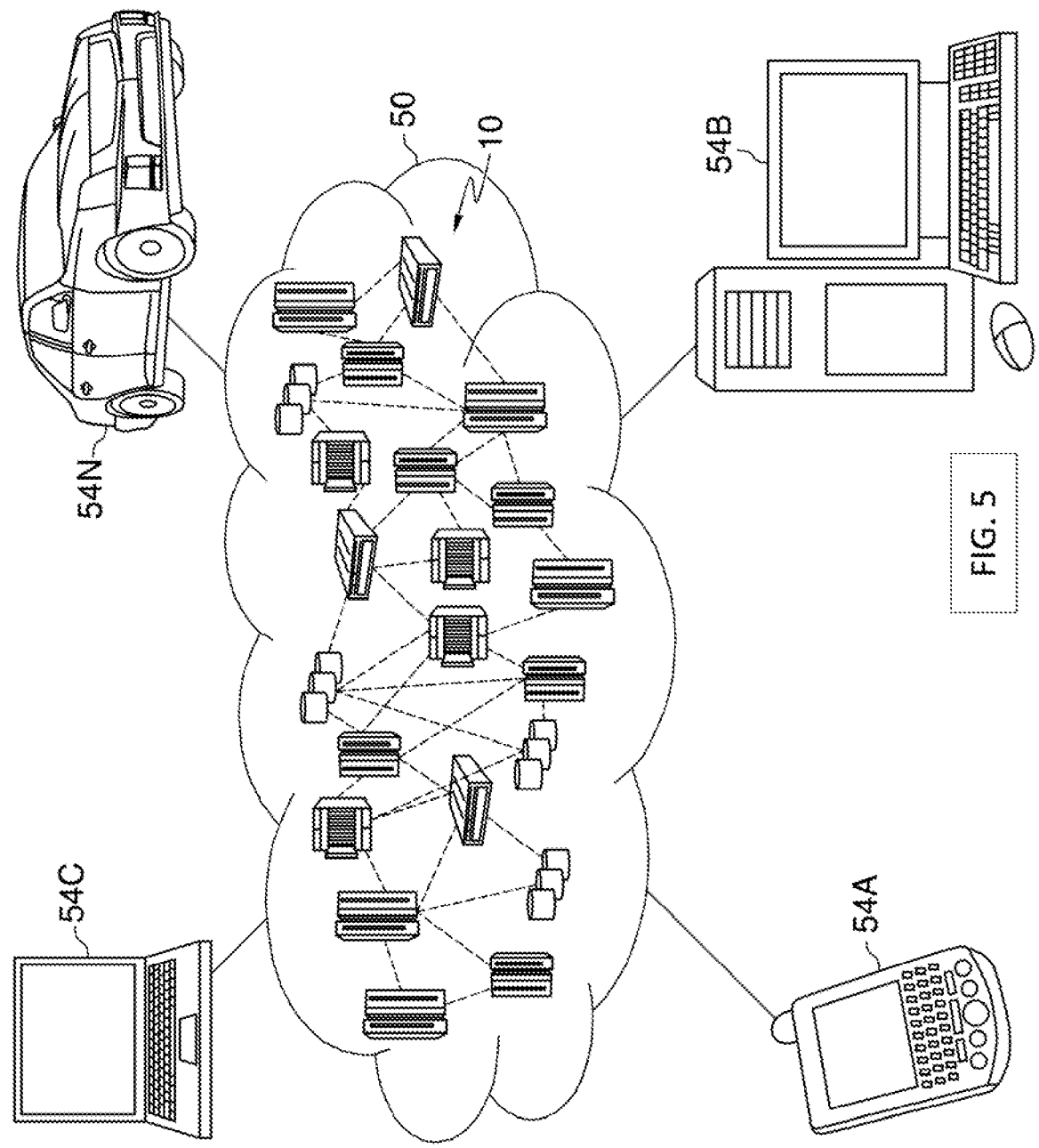
FIG. 5 depicts a cloud computing environment according to an embodiment of the present invention.
Figure 6:
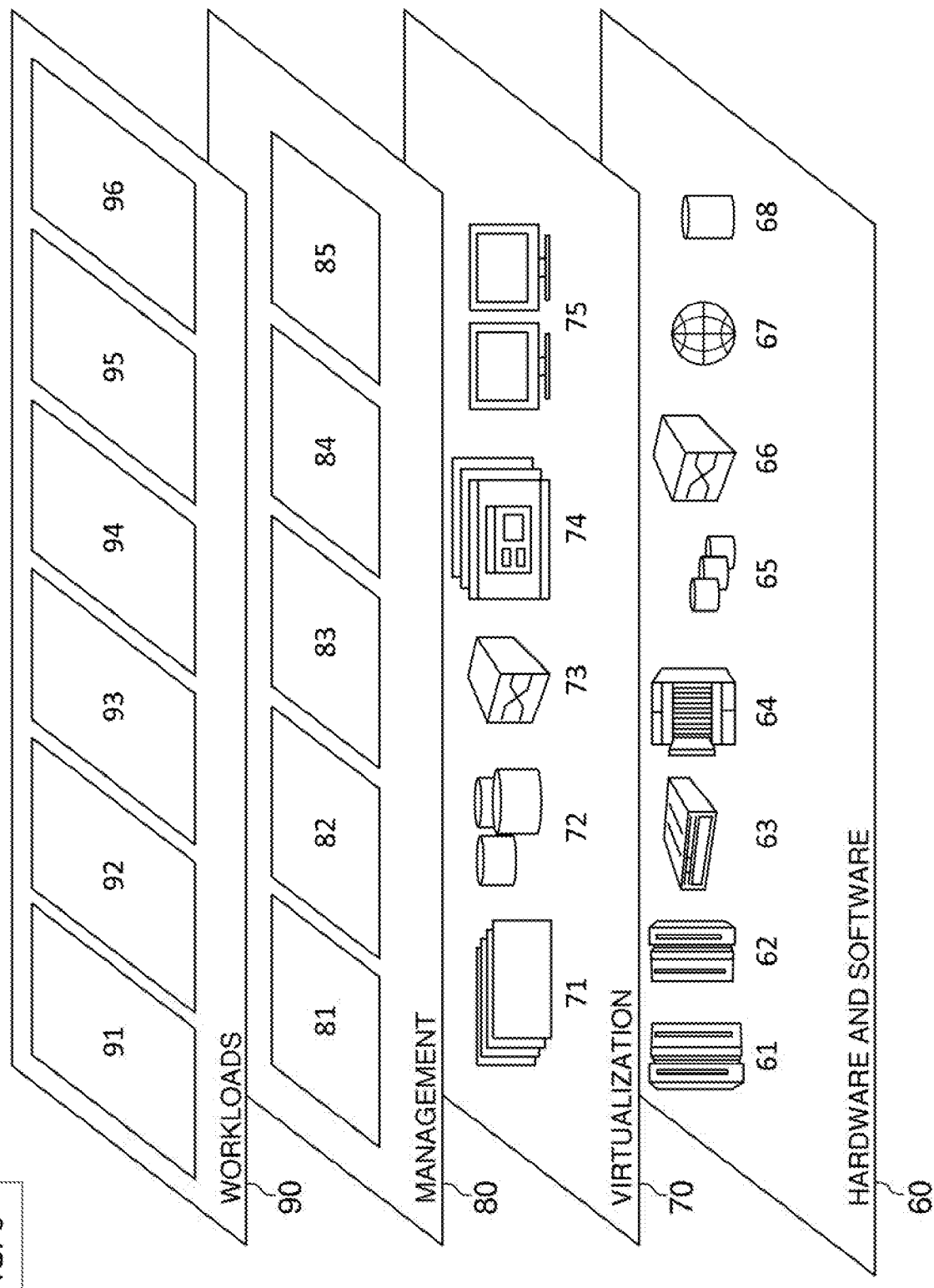
FIG. 6 depicts abstraction model layers according to an embodiment of the present invention.

Server 120 may be a laptop computer, tablet computer, netbook computer, personal computer (PC), a desktop computer, a personal digital assistant (PDA), a smart phone, or any programmable electronic device capable of communicating with user computing device 110. In other embodiments, server 120 may include internal and external hardware components, as depicted, and described in further detail below with respect to FIG. 4, and operate in a cloud computing environment, as depicted in FIGS. 5 and 6.

Server 120 includes a communications unit 122, a hashtag database 130, a content analyzer 132, and a hashtag unit 134. The communications unit 122 is capable of transmitting data from the server 120 and receiving data from devices, such as, the user computing device 110. The hashtag database 130 is a data store that can be comprised of a one database (that includes data about multiple subjects), or a plurality of databases directed towards different subject matters.

Server 120 receives content (e.g. a photo, a video, audio file, text) from the user computing device 110 that the user wants to share. Furthermore, server 120 receives any text, any user generated hashtags, and/or any metadata that accompanies the content. The content analyzer 132 analyzes the received content to determine the subject matter contained within the content. The content analyzer 132 utilizes a recognition algorithm to identify the different elements included in the content. For example, if the content is a nature photo or video of mountains and woods, then the content analyzer 132 determines the type of trees, any type of animal present, the name and location of the mountain (by utilizing the location metadata associated with the content or by distinct landmarks), items (boats, snow mobiles, cabins, etc.), or any other element that can be identified in the photo. For example, if the content is an audio file or text, then the content analyzer 132 utilizes a natural language processing algorithm to determine the subject matter of the content. The content analyzer 132 uses the data that accompanies the content to help identify the subject matter of the content.

Hashtag unit 134 receives the determined/identified subject matter of the content from the content analyzer 132. The hashtag unit 134 retrieves from the hashtag database 130 words and phrases that are directly and indirectly related to the subject matter of the content. For example, directly related to the subject matter can be, for example, the name of the mountain, names of animals, type of boats, etc. For example, indirectly related to the subject matter of the content can be, for example, culture of the area where the content was made, types of food common in that area, types of recreational activity also available in the area (i.e. actives not featured in the content), etc. The hashtag unit 134 creates a hierarchy tree comprised of words and/or phrases that directly and/or indirectly related the subject matter of the content. For example, if the content is a picture of a car, then the top of the hashtag tree can be residential or commercial car, next level down can be the different brands of cars, next level down can be the different models for each brand, then next level down can be different options packages for each model. Furthermore, the hashtag unit 134 can include information in the hashtag tree about the company that manufactures the car (i.e. indirectly relating to the car), where the car is manufactured, etc. The hashtag unit 134 can create a first hashtag tree comprised of words/phrases that are directly relates to the subject matter of the content and the hashtag unit 134 can create a second hashtag tree comprised of words/phrases that are indirectly related to the content. The hashtag unit 134 can create one hashtag tree that is comprised of words/phrases that are directly related and indirectly related to the subject matter of the content.

Each hashtag created by the hashtag unit 134 can be composed of an individual word from either first hashtag tree and/or the second hashtag tree. Furthermore, the hashtag unit 134 can created hashtags composed of a compilation of words/phrases from the first hashtag tree and/or second hashtag tree. The hashtag unit 134 can automatically add the created hashtags to the content, so when the content is posted/uploaded/shared on social media the hashtags created by the hashtag unit 134 are attached to the content. The hashtag unit 134 can automatically create and add hashtags to the content without any user input (the user only provides the content), or the user can be given the opportunity to provide input on creating the hashtags to be added to the content.

The application 112 can give the option to the user to provide input into the creation of the hashtags. The application 112 can give the user multiple options as to how their input can be provided. One option is to have the user use application 112 to create the hashtags, while the application 112 utilizing the created hashtag trees to help the user to create the hashtags. The application 112 receives hashtag trees from the hashtag unit 134, via the network 105. Application 112 displays the content of the hashtag trees to the user to allow the user create hashtags from the hashtag tree. The application 112 can display a first option, for example, utilizing an interactive drop-down menu that displays a word/phrase from the hashtag tree that allows the user to select a word/phrase from the top (first level) of the hashtag tree. The application 112 can add the hashtag (one word) to the content, or the user can be given the option to move down a level in the hashtag tree. The user is given the option to combine the words/phrases from the levels of the tree together or the user can replace the previously added word/phrase with the word/phrase from the current level in the hashtag tree. The application 112 allows for the user to add as many hashtags as the user wants.

A second option for the user to provide input into the creation of the hashtag is for the user to provide a general subject that he wants the hashtags to be directed towards. The application 112 has an input window where the user can input a general subject he wants the hashtags directed towards. The hashtag unit 134 receives the user inputted general subject from the application 112. The hashtag unit 134 generates hashtags directed towards the inputted general subject, where the hashtags are created from the first hashtag tree and/or the second hashtag tree. The hashtag unit 134 automatically adds the generated hashtags to the content, where the generated hashtags are directed towards the user inputted general subject.

Figure 2:
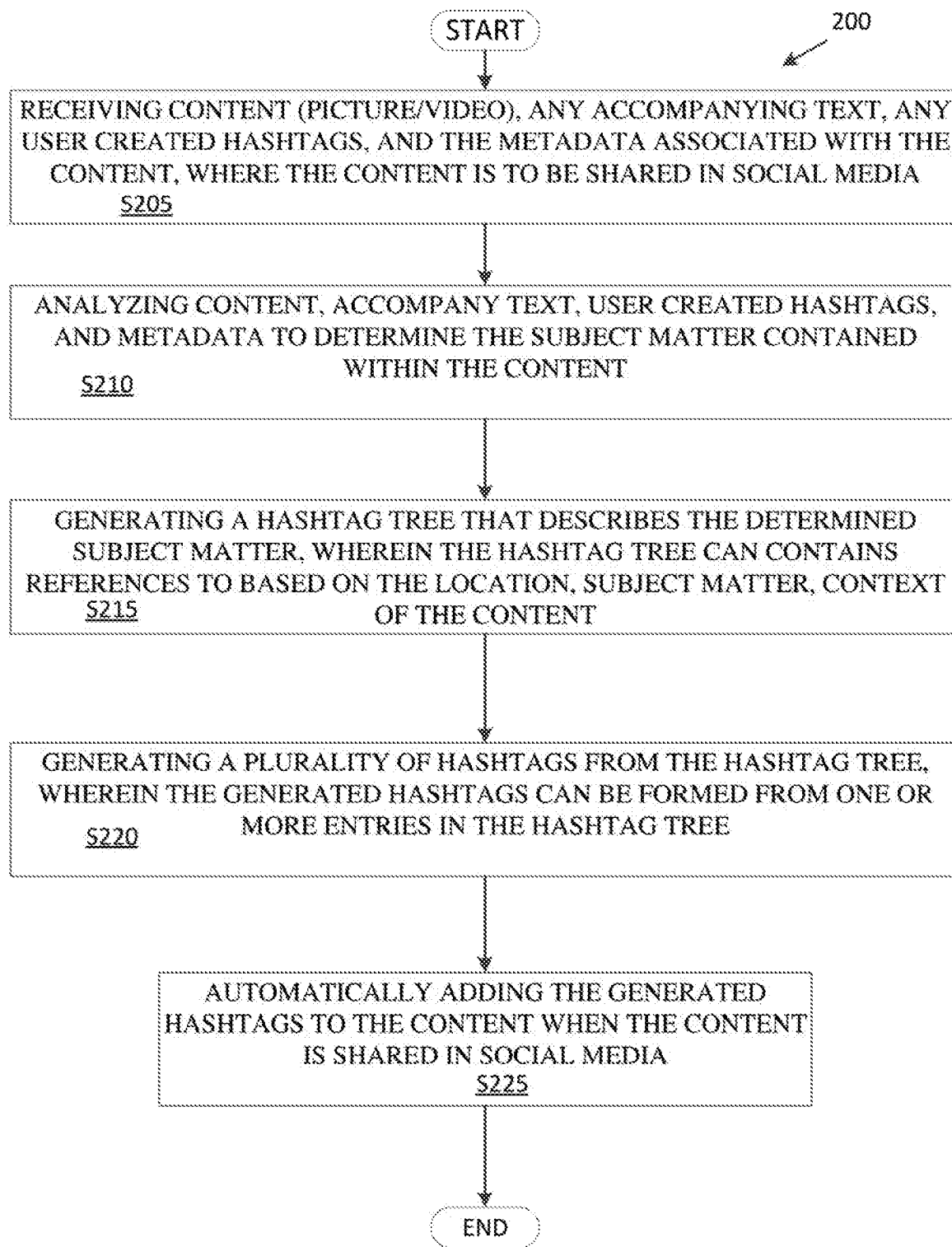
FIG. 2 is a flowchart depicting operational steps of automatically adding hashtags to content within the hashtag processing environment of FIG. 1, in accordance with an embodiment of the present invention.

FIG. 2 is a flowchart depicting operational steps 200 of automatically adding hashtags to content within the hashtag processing environment of FIG. 1, in accordance with an embodiment of the present invention.

The user inputs content into application 112 that the user wants to share on social media. The server 120 receives the content (e.g. photo, video, text, audio file) from the user computing device 110, via network 105, and the server 120 receives any data that accompanies the content, such as, user created hashtags, text, and any metadata (S205). The content analyzer 132 utilizes a recognition algorithm to analyze the content and to analyze the data that accompanies the content to determine the subject matter of the content (S210). The recognition algorithm tries to identify elements contained within the content, such as, landmarks, animals, text, signs, vehicles, or any other type of element the content analyzer 132 can identify. The content analyzer 132 analyzes the data that accompanies the content to help determine the subject matter of the content, for example, the content analyzer 132 can use global positioning coordinates that accompany the content to help identify elements in the content, such as, landmarks, type of trees, types of animal, etc. (S210). The hashtag unit 134 retrieves information from the hashtag database 130, where the received information corresponds to the identified elements of the content (S215). The hashtag unit 134 generates at least one hierarchical hashtag tree based on the elements identified by the content analyzer 132 and the information retrieved from the hashtag database 130 (S215). The generated hashtag tree contains words or phrases the directly describe the subjected matter of the content. The generated hashtag tree contains words or phrases that are indirectly related to the subject matter of the content, or the hashtag unit 134 can generated a second hashtag tree, where the second hashtag tree contains words or phrases that are indirectly related to the subject matter of the content. Indirectly related refers to subject matter that is not directly shown in the content, such as, cultural references, societal references, food references, other actives not shown, etc. The hashtag unit 134 can generate one hashtag tree that includes the direct and indirect words/phrases, or the hashtag unit 134 can separate the direct and indirect words/phrases by generating multiple hashtag trees (S215). The hashtag unit 134 generates a plurality of hashtags from the one or more hashtag trees to be automatically added to the content (S220). The hashtag unit 134 creates the different hashtags by working down the different levels of the hashtag tree. The generated hashtags can be composed of one word, a phrase, or a compilation of words from different levels of the hashtag tree. The hashtag unit 134 automatically adds the generated hashtags to the content (S225).

Figure 3:
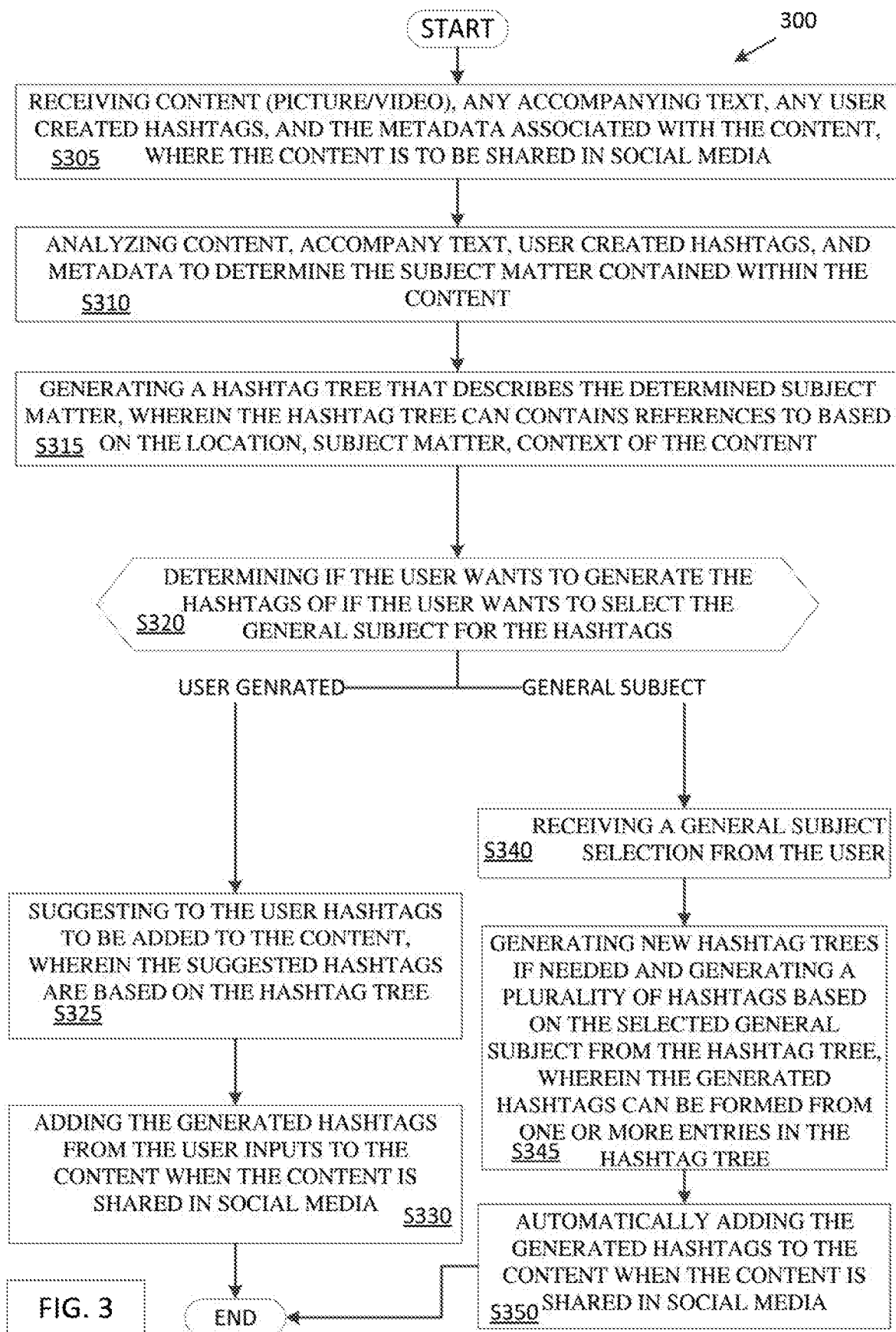
FIG. 3 is a flowchart depicting operational steps of suggesting hashtags for the user to add to the content within the hashtag processing environment of FIG. 1, in accordance with an embodiment of the present invention.

FIG. 3 is a flowchart depicting operational steps 300 of suggesting hashtags for the user to add to the content within the hashtag processing environment of FIG. 1, in accordance with an embodiment of the present invention.

The user inputs content into application 112 that the user wants to share on social media. The server 120 receives the content (e.g. photo, video, text, audio file) from the user computing device 110, via network 105, and the server 120 receives any data that accompanies the content, such as, user created hashtags, text, and any metadata (S305). The content analyzer 132 utilizes a recognition algorithm to analyze the content and to analyze the data that accompanies the content to determine the subject matter of the content (S310). The recognition algorithm looks for items that it can recognize such as landmarks, animals, text, signs, vehicles, or any other type of item the content analyzer 132 can identify. The recognition algorithm tries to identify elements contained within the content, such as, landmarks, animals, text, signs, vehicles, or any other type of element the content analyzer 132 can identify. The content analyzer 132 analyzes the data that accompanies the content to help determine the subject matter of the content, for example, the content analyzer 132 can use global positioning coordinates that accompany the content to help identify elements in the content, such as, landmarks, type of trees, types of animal, etc. (S310). The hashtag unit 134 generates at least one hierarchical hashtag tree based on the elements identified by the content analyzer 132 and the information retrieved from the hashtag database 130 (S315). The generated hashtag tree contains words or phrases the directly describe the subjected matter of the content. The generated hashtag tree contains words or phrases that are indirectly related to the subject matter of the content, or the hashtag unit 134 can generated a second hashtag tree, where the second hashtag tree contains words or phrases that are indirectly related to the subject matter of the content. Indirectly related refers to subject matter that is not directly shown in the content, such as, cultural references, societal references, food references, other actives not shown, etc. The hashtag unit 134 can generate one hashtag tree that includes the direct and indirect words/phrases, or the hashtag unit 134 can separate the direct and indirect words/phrases by generating multiple hashtag trees (S315). The application 112 gives the user different options when the user wants to have a say about the hashtags that are to be attached to the content. The server determines if the user wants to have direct input into the creation of the hashtags or if the user just wants to direct the hashtags towards a general subject (S320). When the user wants to generate the hashtags, then the application 112 suggest words or phrases to the user to select from to form the hashtags, where the application 112 utilizes the one or more generated hashtag trees to make the suggestions (S325). The application 112 has an input window that allows for the user to select words or phrases from the hashtag tree to create the hashtag (S325). The application 112 receives hashtag trees from the hashtag unit 134, via the network 105. Application 112 displays the content of the hashtag trees to the user to allow the user create hashtags from the hashtag tree. The application 112 can display a first option, for example, utilizing an interactive drop-down menu that displays a word/phrase from the hashtag tree that allows the user to select a word/phrase from the top (first level) of the hashtag tree (S325). The application 112 can add the hashtag (one word) to the content (S330), or the user can be given the option to move down a level in the hashtag tree (S325). The user is given the option to combine the words/phrases from the levels of the tree together or the user can replace the previously added word/phrase with the word/phrase from the current level in the hashtag tree (S325). The application 112 or the hashtag unit 134 can added the generated hashtags to the content to be shared on social media (S330).

When the user selects a general subject that he wants the hashtags direct towards by the user inputting the general subject into application 112 (S320). Hashtag unit 134 receives the selected general subject, via the network 105 (S340). The hashtag unit 134 determines if the user inputted general subject is covered by the generated hashtag trees or if the generated hashtags trees need to be redone S345). The hashtag unit 134 generates a plurality of hashtags directed towards the user inputted general subject from the one or more hashtag trees to be automatically added to the content (S345). The hashtag unit 134 creates the different hashtags by working down the different levels of the hashtag tree. The generated hashtags can be composed of one word, a phrase, or a compilation of words from different levels of the hashtag tree (S345). The hashtag unit 134 works down the different levels of the hashtag tree to create the different hashtags. The generated hashtags can be composed of one word, a phrase, or a compilation of words from the hashtag tree. The hashtag unit 134 automatically adds the generated hashtags to the content (S350).

Figure 4:
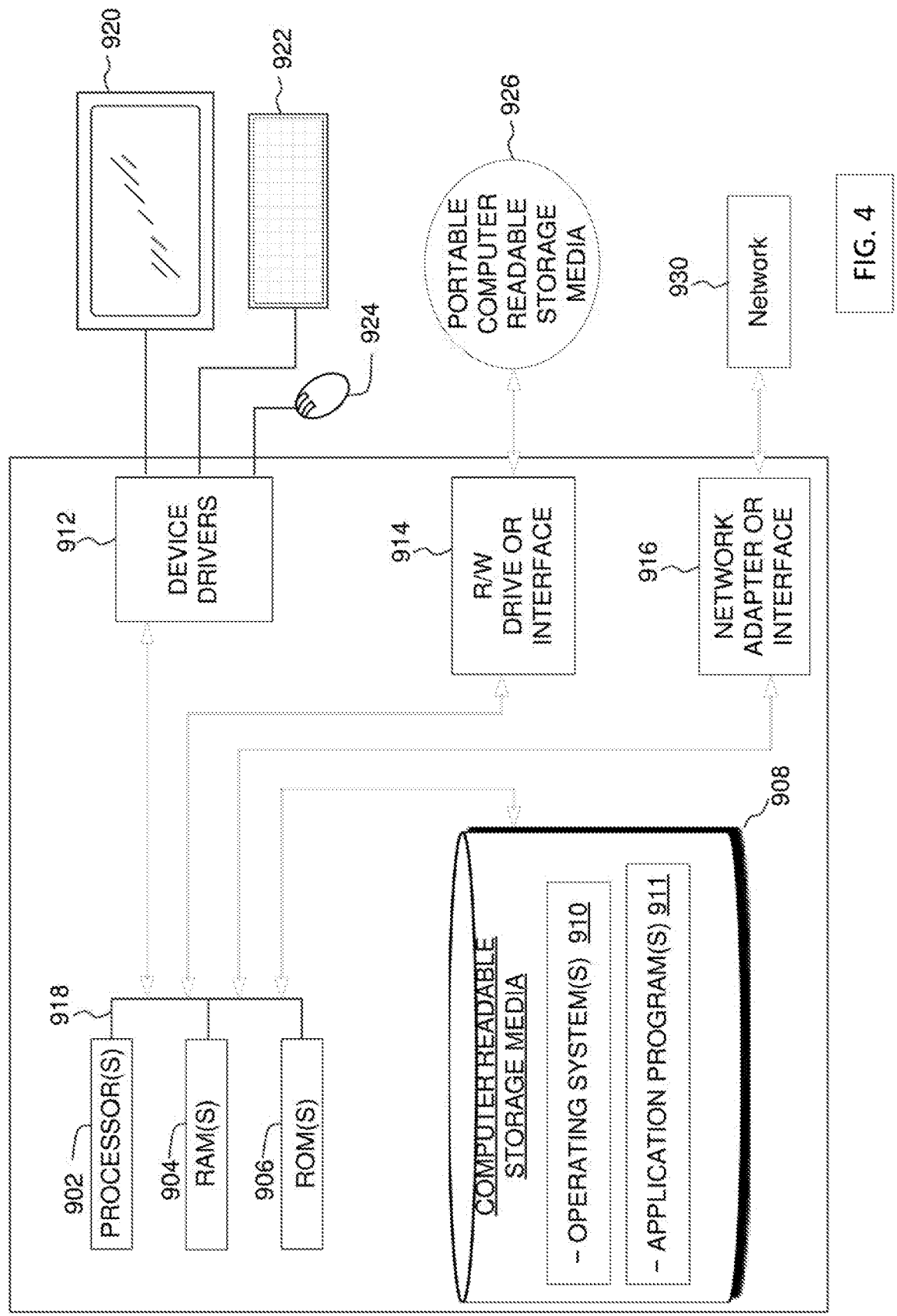
FIG. 4 is a block diagram of components of a computing device of the hashtag processing environment of FIG. 1, in accordance with embodiments of the present invention.

FIG. 4 depicts a block diagram of components of user computing device 110 or server 120 the hashtag processing environment 100 of FIG. 1, in accordance with an embodiment of the present invention. It should be appreciated that FIG. 4 provides only an illustration of one implementation and does not imply any limitations regarding the environments in which different embodiments may be implemented. Many modifications to the depicted environment may be made.

User computing device 110 and server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, hashtag unit 134 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 110 and server 120 may also include a R/W drive or interface 914 to read from and write to one or more portable computer readable storage media 926. Application programs 911 on user computing device 110 and server 120 may be stored on one or more of the portable computer readable storage media 926, read via the respective R/W drive or interface 914 and loaded into the respective computer readable storage media 908.

User computing device 110 and server 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on user computing device 110 and server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 110 and server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hashtag unit 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for generating hashtags, the method comprising:
receiving, by a computer, content to be posted on a social media service;
analyzing, by the computer, the content to identify at least one item included in the content;
generating, by the computer, a first hierarchical hashtag tree, wherein the content of the first hierarchical hashtag tree contains information that indirectly related to the identified at least one item, wherein the first hierarchical hashtag tree is comprised of multiple levels, wherein the first hierarchical hashtag tree includes words or phrases that relate to subject matter not directly shown in the content and relate to the identified at least one item included in the content, wherein the at least one hashtag generated from the first hierarchical hashtag tree containing information that indirectly relates to the identified at least one item is comprised of a compilation of words from different levels of the hierarchical hashtag tree;
generating, by the computer, at least one hashtag from the first hierarchical hashtag tree; and
adding, by the computer, the at least one hashtag to the content and posting the content and the adding at least one hashtag to the social media service, wherein the at least one hashtag is automatically added.

2. The method of claim 1, wherein the generating the first hierarchical hashtag tree, further comprises generating a second hierarchical hashtag tree, wherein the content of the second hierarchical hashtag tree contains information that directly relates to the identified at least one item, wherein the second hierarchical hashtag tree is comprised of multiple levels, wherein the second hierarchical hashtag tree includes words or phrases directly relates to the identified at least one item.

3. The method of claim 2, further comprises:
generating, by the computer, at least one hashtag from the second hierarchical hashtag tree; and
adding, by the computer, the at least one hashtag generated from the first hierarchical hashtag tree and the at least one hashtag generated from the second hierarchical hashtag tree to the content and posting the content and the added at least two hashtags to the social media service, wherein the at least two hashtags are automatically added.

4. The method of claim 1, wherein the first hierarchical hashtag tree further comprises information that directly relates to the identified at least one item.

5. The method of claim 4, wherein the generating the at least one hashtag from the first hierarchical hashtag tree, further comprises generating at least one hashtag generated from the information that directly relates to the identified at least one item.

6. The method of claim 5, wherein the adding, by the computer, the at least one hashtag further comprises adding at least two hashtags to the content, wherein one hashtag was generated from information that indirectly relates to the identified at least one item and one hashtag was generated from information that directly relates to the identified at least one item.

7. The method of claim 5, wherein the at least one hashtag generated from the information that directly relates to the identified at least one item is comprised of a compilation of words from different levels of the hierarchical hashtag tree.

8. A computer program product for generating hashtags, the computer program product comprising:
one or more non-transitory computer-readable storage media and program instructions stored on the one or more non-transitory computer-readable storage media, the program instructions comprising:
program instructions to receive content to be posted on a social media service;
program instructions to analyze the content to identify at least one item included in the content;
program instructions to generate a first hierarchical hashtag tree, wherein the content of the first hierarchical hashtag tree contains information that indirectly related to the identified at least one item, wherein the first hierarchical hashtag tree is comprised of multiple levels, wherein the first hierarchical hashtag tree includes words or phrases that relate to subject matter not directly shown in the content and relate to the identified at least one item included in the content, wherein the at least one hashtag generated from the first hierarchical hashtag tree containing information that indirectly relates to the identified at least one item is comprised of a compilation of words from different levels of the hierarchical hashtag tree;

program instructions to generate at least one hashtag from the first hierarchical hashtag tree; and program instructions to add the at least one hashtag to the content and posting the content and the added at least one hashtag to the social media service, wherein the at least one hashtag is automatically added.

9. The computer program product of claim 8, wherein the generating first hierarchical hashtag tree, further comprises generating a second hierarchical hashtag tree, wherein the content of the second hierarchical hashtag tree contains information that directly relates to the identified at least one item, wherein the second hierarchical hashtag tree is comprised of multiple levels, wherein the second hierarchical hashtag tree includes words or phrases directly relates to the identified at least one item.

10. The computer program product of claim 9, further comprises:

program instructions to generate at least one hashtag from the second hierarchical hashtag tree; and program instructions to add the at least one hashtag generated from the first hierarchical hashtag tree and the at least one hashtag generated from the second hierarchical hashtag tree to the content and posting the content and the added at least two hashtags to the social media service, wherein the at least two hashtags are automatically added.

11. The computer program product of claim 8, wherein the first hierarchical hashtag tree further comprises information that directly relates to the identified at least one item.

12. The computer program product of claim 11, wherein the generating at least one hashtag from the first hierarchical hashtag tree, further comprises generating at least one hashtag generated from the information that directly relates to the identified at least one item.

13. The computer program product of claim 12, wherein the adding the at least one hashtag further comprises adding at least two hashtags to the content, wherein one hashtag was generated from information that indirectly relates to the identified at least one item and one hashtag was generated from information that directly relates to the identified at least one item.

14. A computer system for generating hashtags, the computer system comprising:

one or more computer processors, one or more computer-readable storage media, and program instructions stored on one or more of the computer-readable storage media for execution by at least one of the one or more processors, the program instructions comprising:

program instructions to receive content to be posted on a social media service;

program instructions to analyze the content to identify at least one item included in the content;

program instructions to generate a first hierarchical hashtag tree, wherein the content of the first hierarchical hashtag tree contains information that indirectly related to the identified at least one item, wherein the first hierarchical hashtag tree is comprised of multiple levels, wherein the first hierarchical hashtag tree includes words or phrases that relate to subject matter not directly shown in the content and relate to the identified at least one item included in the content, wherein the at least one hashtag generated from the first hierarchical hashtag tree containing information that indirectly relates to the identified at least one item is comprised of a compilation of words from different levels of the hierarchical hashtag tree;

program instructions to generate at least one hashtag from the first hierarchical hashtag tree; and program instructions to add the at least one hashtag to the content and posting the content and the added at least one hashtag to the social media service, wherein the at least one hashtag is automatically added.

15. The computer system of claim 14, wherein the first hierarchical hashtag tree further comprises information that directly relates to the identified at least one item.

16. The computer system of claim 15, wherein the generating at least one hashtag from the first hierarchical hashtag tree, further comprises generating at least one hashtag generated from the information that directly relates to the identified at least one item.

17. The computer system of claim 16, wherein the adding the at least one hashtag further comprises adding at least two hashtags to the content, wherein one hashtag was generated from information that indirectly relates to the identified at least one item and one hashtag was generated from information that directly relates to the identified at least one item.

* * * * *